US010322658B2

(12) United States Patent
Borkgren et al.

(10) Patent No.: US 10,322,658 B2
(45) Date of Patent: Jun. 18, 2019

(54) SEALED CLOSURE ARRANGEMENT FOR TANK OPENING OF AGRICULTURAL MACHINE

(71) Applicant: Deere & Company, Moline, IL (US)

(72) Inventors: Stanley R. Borkgren, Geneseo, IL (US); Terry L. Snipes, East Moline, IL (US); Tyler G. Groves, Bettendorf, IA (US)

(73) Assignee: DEERE & COMPANY, Moline, IL (US)

(*) Notice: Subject to any disclaimer, the term of this patent is extended or adjusted under 35 U.S.C. 154(b) by 240 days.

(21) Appl. No.: 14/853,338

(22) Filed: Sep. 14, 2015

(65) Prior Publication Data
US 2017/0073154 A1 Mar. 16, 2017

(51) Int. Cl.
B60P 1/00 (2006.01)
(52) U.S. Cl.
CPC ..................... B60P 1/00 (2013.01)
(58) Field of Classification Search
CPC .......... B65D 90/10; B65D 88/128; B60P 1/00
USPC ........................................................ 220/326
See application file for complete search history.

(56) References Cited

U.S. PATENT DOCUMENTS 3,694,962 A  10/1972 McDonald et al.
6,902,082 B2 * 6/2005 Mabry ..................... B01D 3/10
                                                        105/377.07
7,658,570 B2  2/2010 Hill et al.
2004/0069193 A1 * 4/2004 Memory ................. A01C 7/102
                                                        111/13
2012/0325812 A1 * 12/2012 Guinart Pallares ...... F16J 13/22
                                                        220/212

FOREIGN PATENT DOCUMENTS

CN    202493672 U    10/2012
CN    203463182 U    3/2014

OTHER PUBLICATIONS

Exhibit 1, Images of AMITY 5250, undated, admitted prior art.
Exhibit 2, Image of Bourgault 7950, Jun. 15, 2011.
Exhibit 3, Images of Case New Holland P1070 & 3580, undated, admitted prior art.
Exhibit 4, Image of Great Plains ADC2350B, undated, admitted prior art.

(Continued)

Primary Examiner — Jeffrey R Allen
(74) Attorney, Agent, or Firm — Klintworth & Rozenblat IP LLP

(57) ABSTRACT

A closure arrangement for a tank includes a tank lid and an opening flange. The opening flange has first and second tank flange lips spaced by an offset distance. The tank flange lips extend toward one side of the tank. The tank has a lid flange with first and second lid lips spaced by an offset distance corresponding to the offset distance. The lid lips extend, at least in part, toward a second side of the tank. The lid lips include first and second walls arranged at a tank interior side of the respective first and second tank flange lips in an offset direction. When the tank lid is closed over the tank opening, one or more seals engage the tank flange lips from the tank interior side and engage the lid lip walls of the lid flange from an exterior side of the tank in the offset direction.

20 Claims, 11 Drawing Sheets

(56) References Cited

OTHER PUBLICATIONS

Exhibit 5, Images of Horsch Anderson SW1000, Jun. 22, 2012.
Exhibit 6, Images of Morris 9450 and 9650, undated, admitted prior art.
Exhibit 7, Images of Salford Commodity Cart, Jun. 22, 2012.
Exhibit 8, Images of Seed Hawk 800, Jun. 19, 2013.
Exhibit 9, Images Seed Master NOVA XP 780, undated, admitted prior art.
Exhibit 10, Images of Versatile Commodity Cart, undated, admitted prior art.
Exhibit 11, Images of Montag Commodity Cart, undated, admitted prior art.
Exhibit 12, Norwoodsales.com, S3 Commercial Tender Brochure, undated, admitted prior art.
Exhibit 13, Image of Seed Shuttle 500, undated, admitted prior art.
Exhibit 14, Images of Pressurized Compartment Lids, undated, admitted prior art.

* cited by examiner

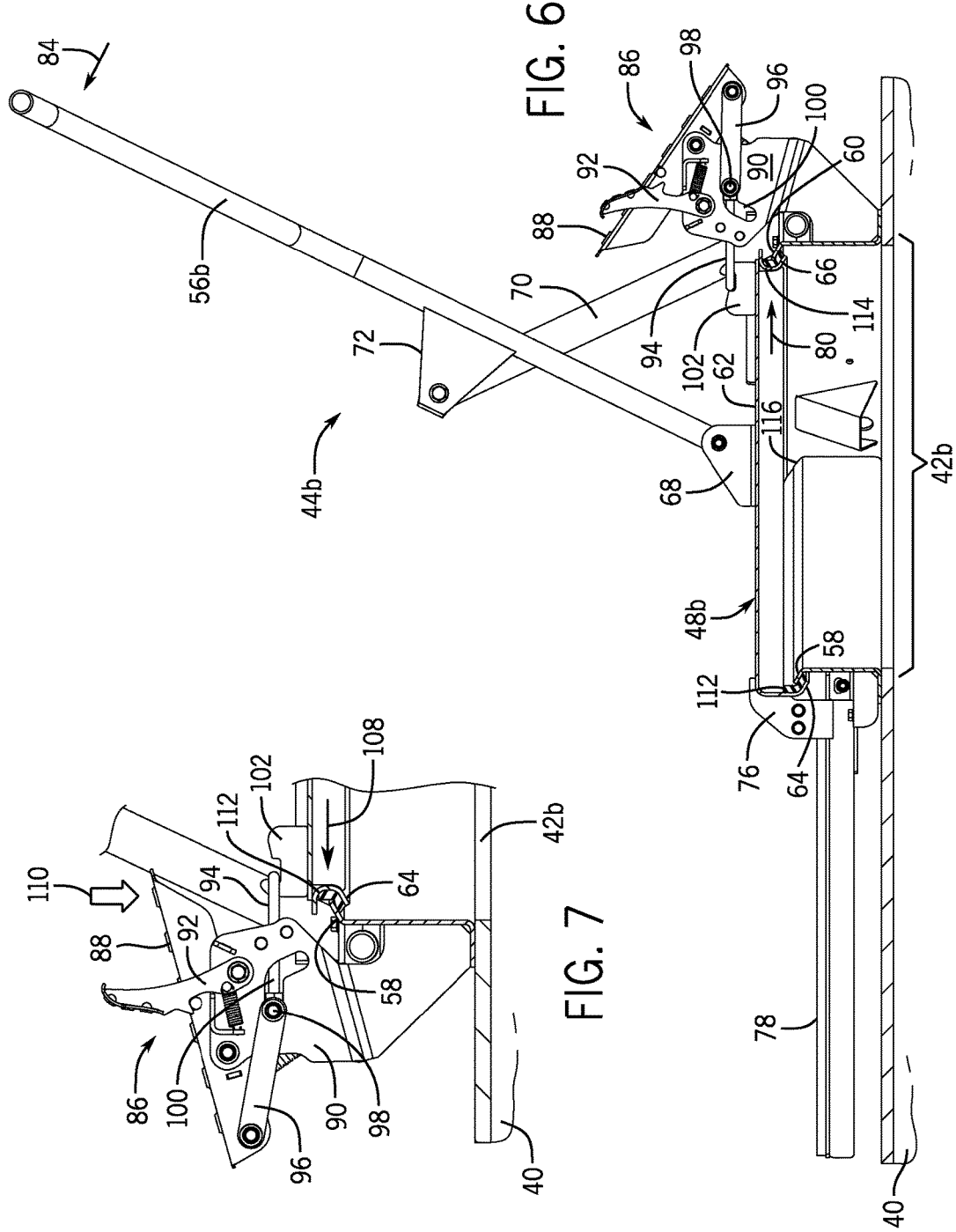

SEALED CLOSURE ARRANGEMENT FOR TANK OPENING OF AGRICULTURAL MACHINE

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to closure mechanisms, including closures for openings in tanks of agricultural machines.

BACKGROUND OF THE DISCLOSURE

Various work vehicles, agricultural machines and the like may carry large supply tanks or containers for various materials. As one example, supply carts for use with seeding machines have one or more tanks that contain various liquid or dry materials, such as fertilizers, seeds and the like. Typically, the tanks have large openings at their tops that are used to fill the tanks with material. Lids cover and seal the openings from outside of the tanks.

In practice, the supply carts are towed in a train with the seeding machine (e.g., before or after the seeding machine) by a tractor running over a field. The supply carts may have a pressurized delivery system that transfers materials within the tanks to the seeding machine. For dry materials, for example, the delivery system may be a forced air system. In any case, the tanks may be pressurized internally, and the corresponding internal force of pressurization acting on the relatively large tank lids may tend to dislodge or otherwise disrupt the seals at the openings. This may lead to pressure loss and poor operation of the delivery system as well as loss or contamination of the material supply.

SUMMARY OF THE DISCLOSURE

This disclosure provides a closure arrangement that may be configured to seal the openings of containers, including pressurized supply tanks, used in various work vehicles, such as supply carts for seeding machines.

In one aspect the disclosure provides a closure assembly, which may be used in an agricultural machine having a supply tank with a tank opening. The closure assembly may include a tank opening, a tank opening flange surrounding the tank opening, and a tank lid. The tank opening flange may have a first tank flange lip and a second tank flange lip at a tank opening flange offset distance from the first tank flange lip in an offset direction opposite an interior of the tank. The first and second tank flange lips may extend, at least in part, toward a first side of the tank and be separated by tank opening flange transition walls extending in the offset direction. The tank lid may have a cover and a lid flange having a first lid lip and a second lid lip at a lid flange offset distance from the first lid lip in the offset direction corresponding to the tank opening flange offset distance. The first and second lid lips may extend, at least in part, toward a second side of the tank opposite the first side of the tank and be separated by lid flange transition walls extending in the offset direction. The first and second lid lips may include first and second lid lip walls arranged at a tank interior side of the respective first and second tank flange lips in the offset direction. At least one seal disposed may be between the tank opening flange and the tank lid so that, when the tank lid is mounted to the tank opening flange to close the tank opening, the at least one seal engages the first and second tank flange lips of the tank opening flange from the tank interior side and engages the first and second lid lip walls of the lid flange from an exterior side of the tank in the offset direction.

Another aspect of the disclosure provides an agricultural machine having a supply tank with a tank opening and a tank opening flange. The tank opening flange may have a first tank flange lip and a second tank lip at a tank opening flange offset distance from the first tank lip in an offset direction opposite a tank interior. The first and second tank lips may extend, at least in part, toward a first side of the tank and be separated by tank opening flange transition walls extending in the offset direction. A tank lid may have a cover and a lid flange with a first lid lip and a second lid lip at a lid flange offset distance from the first lid lip in the offset direction corresponding to the tank opening flange offset distance. The first and second lid lips may extend, at least in part, toward a second side of the tank opposite the first side and be separated by lid flange transition walls extending in the offset direction. The first and second lid lips may include first and second lid lip walls arranged at a tank interior side of the respective first and second tank lips in the offset direction. At least one seal may be disposed between the tank opening flange and the tank lid so that when the tank lid is mounted to close the tank opening the at least one seal engages the first and second tank lips of the tank opening flange from the tank interior side and the first and second lid lip walls of the lid flange from a tank exterior side in the offset direction.

The details of one or more embodiments are set forth in the accompanying drawings and the description below. Other features and advantages will become apparent from the description, the drawings, and the claims.

BRIEF DESCRIPTION OF THE DRAWINGS

FIGS. 5 and 6 are cross-sectional views of the closure assembly shown in FIGS. 3 and 4 in open and closed positions, respectively;

FIG. 7 is a cross-sectional view of a portion of the closure assembly shown in FIGS. 3-6 illustrating a foot-operated latch in greater detail;

Like reference symbols in the various drawings indicate like elements.

DETAILED DESCRIPTION

Figure 1:
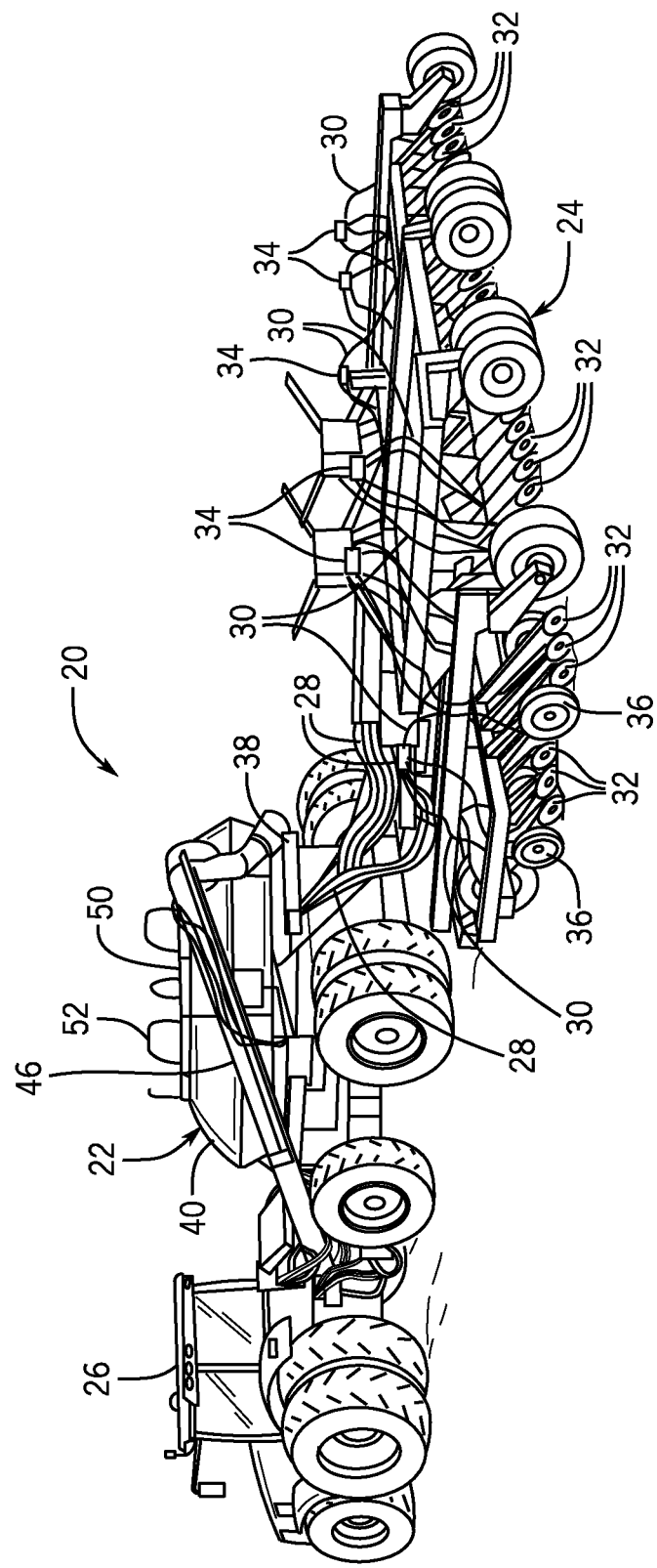
FIG. 1 is a perspective view of an air commodity dispersal (ACD) system including an ACD cart, as illustrated in accordance with an example embodiment.

The following describes one or more example embodiments of the sealed closure arrangement for a tank opening, as shown in the accompanying figures of the drawings described briefly above. Various modifications to the example embodiments may be contemplated by one of skill in the art.

Closure assemblies having pressure-energized, under seal lids are provided. The closure assemblies may be useful to sealingly enclose pressurized tanks of an agricultural machine, such as an air commodity dispersal ("ACD") cart. As indicated by the term "pressure-energized," the closure assemblies may be configured such that pressure loading on a tank lid (specifically, pressure exerted on the interior of the tank lid) tends to reinforce, rather than compromise, the seal formed by the closure assembly when the tank lid is closed. This is highly desirable in the context of an ACD cart, which often includes a number of relatively large tank openings to permit seed, fertilizer, and other agricultural commodities to be spread about the interior of the pressurized supply tank during filling. As a corollary, such ACD carts also often include relatively large tank lids that, when sealed closed over the tank openings and exposed to even modest internal air pressures, are subject to significant pressure loading forces due to the relatively large lid surface areas on which the internal tank pressures act. In the case of conventional closure assemblies, such significant pressure loading may potentially dislodge the sealing elements or otherwise compromise the integrity of the seal formed between the tank openings and the tank lids when closed. In contrast, embodiments of the pressure-energized closure assemblies provide a high integrity, low leakage seal even when subject to relatively significant internal pressure loading. This, in turn, allows prolonged operation of the ACD cart at optimum pneumatic performance levels, while avoiding contamination of the agricultural commodities contained within the pressurized supply tank.

In addition to providing a low leakage seal during pressure loading, embodiments of the closure assemblies may provide other benefits and functionalities. For example, the closure assemblies may include handles, which project upwardly from the tank lids to provide convenient manual access in embodiments wherein the closure assemblies are manually opened by an operator standing above the tank lids, as may be the case when the closure assemblies are positioned along the upper walkway or platform of an ACD cart. Additionally, the handles may provide a gate function by blocking openings in the railing of the platform when the tank lids are in closed positions, while rotating or otherwise moving into positions permitting unfettered manual access to the tank openings when the tank lids are opened. Embodiments of the closure assembly may further allow the sealing interface formed between flanges provides around the tank lid and the tank opening to fully disengage or "unseat" with a relatively short travel of the tank lid away from its closed position. This, in turn, may allow the tank lid to be manually opened with relative ease and help reduce seal wear. In still further embodiments, the closure assemblies may each include a pull-action latch, which exerts a lateral closure or pre-load force in the direction in which the tank lid is closed when the latch is engaged to help seal any vertical transition areas of the seal interface and thereby further enhance seal integrity. The latch may be foot-operated in embodiments wherein the closure assemblies are manually opened by an operator standing above the tank lids. The closure assemblies may also include various other features to facilitate opening and closing of the tank lids, to enhance seal integrity when the lids are closed, to increase safety, or to provide other such benefits, as described below.

With reference now to the drawings, example closure arrangements will be described in the context of a commodity dispersal system, including an agricultural tractor towing an air cart and an air seeding or planting machine. While such a system is illustrated as an example herein, one skilled in the art will recognize that the example closure arrangements disclosed herein may be readily adapted for use with other types work vehicles or other non-vehicle applications. As such, the present disclosure should not be limited to applications associated with the disclosed.

Referring now to FIG. 1, an ACD system 20, including an ACD cart 22 and a seeding machine 24, is illustrated in accordance with an example embodiment of the present invention. During operation, the ACD system 20 is pulled by a tractor 26 or otherwise moved across a field to distribute one or more agricultural commodities, such as seeds and fertilizer, held within the ACD cart 22. The agricultural commodities are carried by pressurized airstreams from the ACD cart 22 to the seeding machine 24, which then deposits or plants the commodities in the soil over which the ACD system 20 travels. A network of air conduits or plumbing lines 28, 30 conduct the commodity-entrained airstreams to a number of deposition tubes 32, which are arranged in different row units laterally spaced across the seeding machine 24. More specifically, a relatively small number of main air lines 28 may initially conduct the commodity-entrained airstreams from the ACD cart 22 to a number of distribution towers 34 mounted to the seeding machine 24 at various locations. The distribution towers 34 may then divide the airstreams amongst a larger number of secondary air lines 30, which then convey the commodity to the deposition tubes 32 for planting or deposition within the ground. The row units of the seeding machine 24 may also include various ground-engaging tools 36 (only a few of which may be seen in FIG. 1), which assist in the commodity deposition process by, for example, opening furrows, packing soil, and closing furrows over the newly-deposited commodities.

Figure 2A:
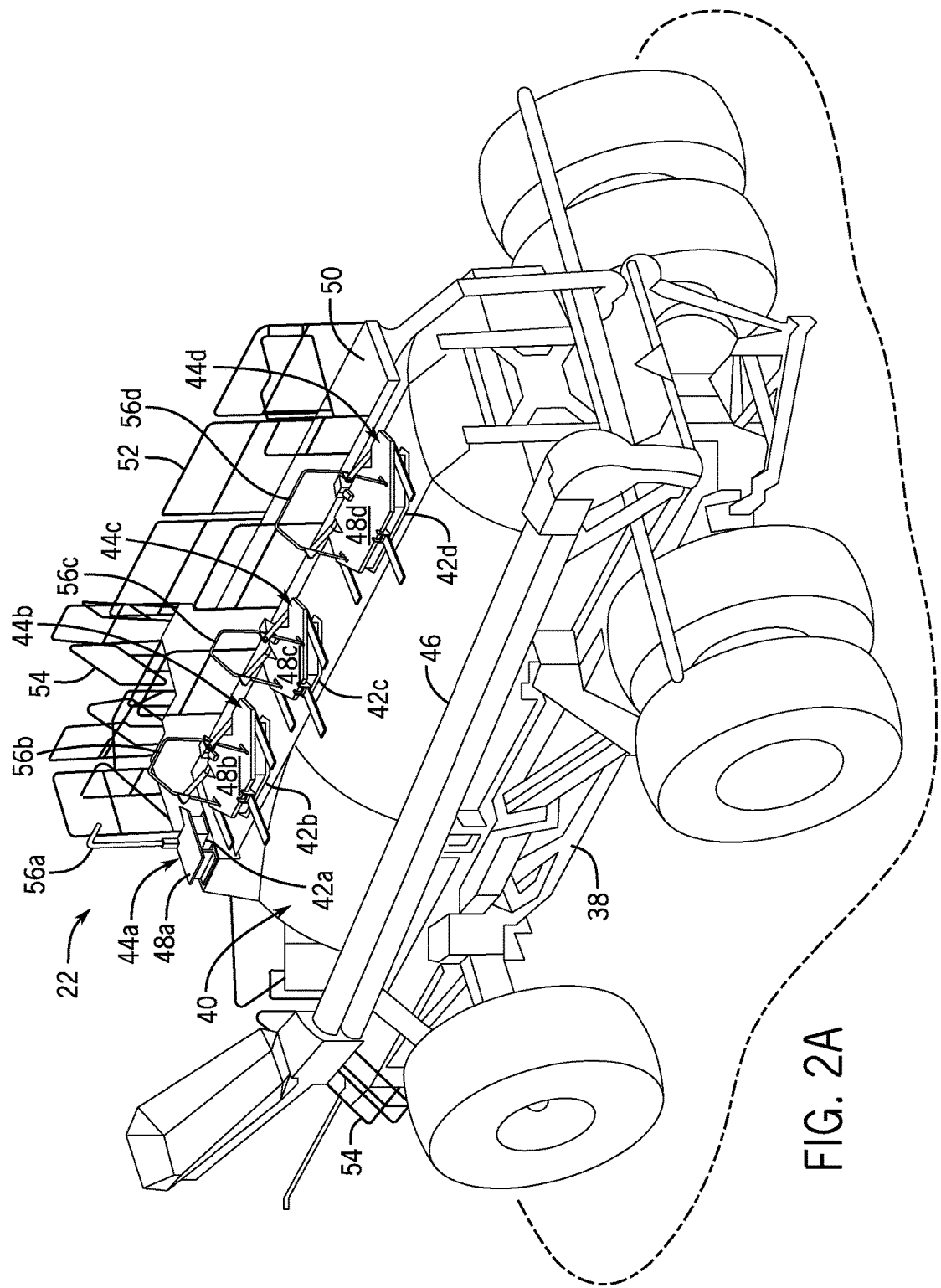
FIG. 2A is a perspective view of the ACD cart shown in FIG. 1 illustrating a number of closure assemblies installed around the openings of a pressurized supply tank, as illustrated in accordance with a further example embodiment.
Figure 2B:
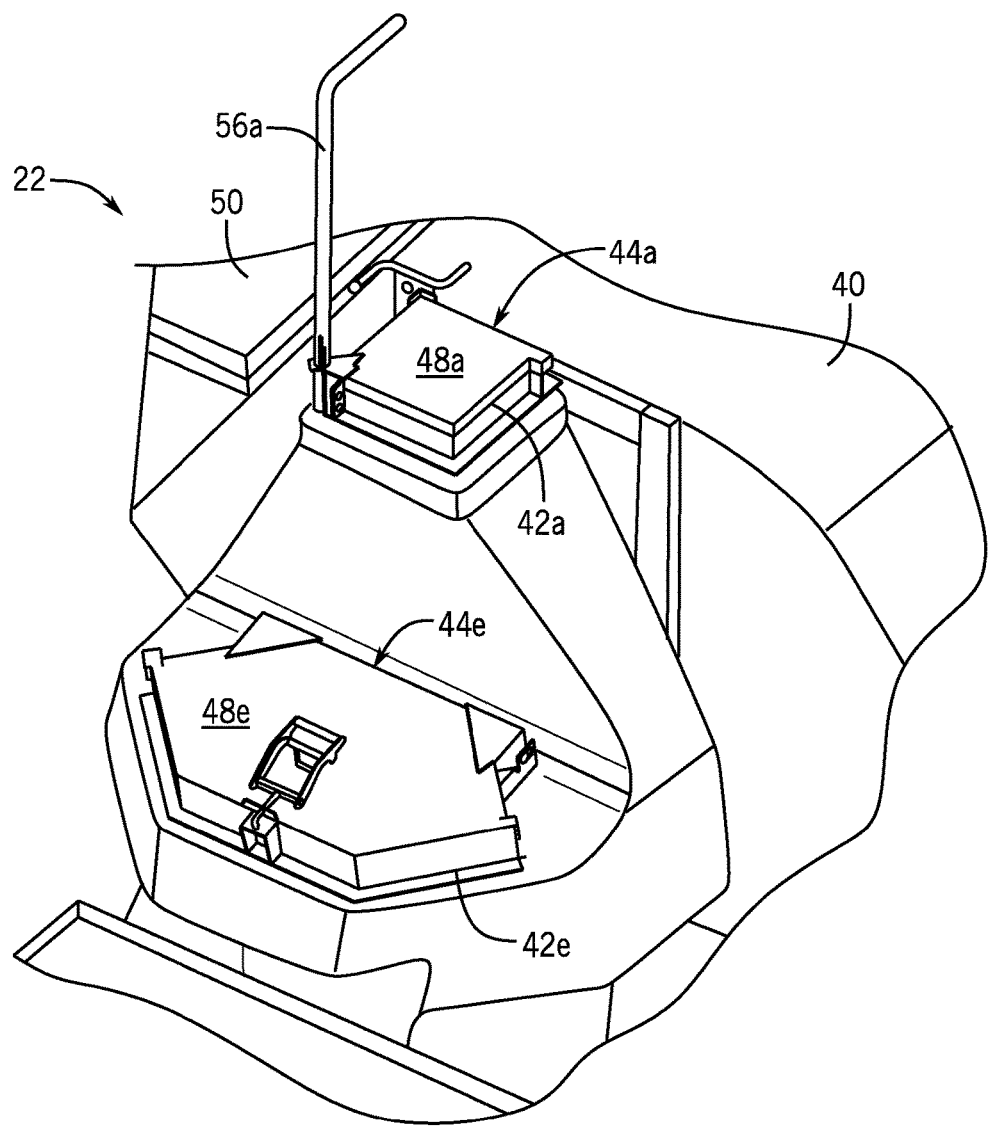
FIG. 2B is a more detailed view of a portion of the ACD cart shown in FIGS. 1 and 2A illustrating some of the closure assemblies installed on the ACD cart.

Turning to FIGS. 2A-B, it may be seen that the ACD cart 22 includes a wheeled chassis or frame 38 on which one or more pressurized supply tanks are mounted, such as pressurized supply tank 40. The pressurized supply tank 40 may have multiple internally-partitioned compartments or "commodity chambers" each suitable for holding one or more types of agricultural commodities. A number of tank openings 42 are provided in pressurized supply tank 40 and each provide physical access to a corresponding commodity chamber within tank 40. Four such tank openings 42a-d are visible in FIG. 2A and spaced along the topside of pressurized supply tank 40. Additionally, a fifth tank opening 42e is provided in a forward portion of pressurized supply tank 40 as shown most clearly in the partial view of the ACD cart 22 shown in FIG. 2B. In further embodiments, the ACD cart 22 may include fewer or a greater number of the tank openings 42, which may provide access to any number of compartments or chambers contained within the pressurized supply tank 40. The tank openings 42 are desirably produced to be relatively large to permit commodities to be spread about the commodity chambers in a substantially even or distributed manner during filling. The tank openings 42 may vary size in conjunction with their corresponding commodity chambers, which may likewise vary in size depending upon the particular volume of commodity each chamber is intended to hold. As shown in FIGS. 1 and 2A, the ACD cart 22 may be equipped with movable conveyor arm 46 to facilitate filling of the commodity chambers corresponding to the tank openings 42*a-e*.

Pressure-energized closure assemblies 44*a-e* are installed over the tank openings 42*a-e*, respectively. The pressure-energized closure assemblies 44*a-e* include tank lids 48*a-e*, which are movable between closed and open positions. In the closed position, the tank lids 48*a-e* sealingly cover their respective tank openings 42*a-e*. The tank lids 48*a-d* are positioned along an elongated platform 50 extending above and along the length of the pressurized supply tank 40. The platform 50 is surrounded by a railing 52 and accessible utilizing a stairway 54 located adjacent the forward end of pressurized supply tank 40. The closure assemblies 44*a-d* further include handles 56*a-d*, respectively, which project upwardly from the tank lids 48*a-d* to allow an operator to move the lids 48*a-d* between their open and closed positions while standing on the platform 50. Openings or gateways are provided in the railing 52 to provide access to the handles 56*a-d*. The openings provided in the railing 52 are blocked by the handles 56*a-d* when the tank lids 48*a-d* are closed as shown in FIG. 2A, but rotate or otherwise move into non-blocking positions when the tank lids 48*a-d* are opened. In this manner, the handles 56*a-d* effectively serve as gates that open in conjunction with the opening of the closure assemblies 44*a-d*, but otherwise remain in a closed or blocking orientation to help enclose the perimeter of platform 50 for safety purposes. Additional description of the manner in which the handle 56*b*, and by extension the handles 56*c* and 56*d*, may provide such a gate functionality is provided below in conjunction with FIGS. 3-6. The closure assembly 44*e* (FIG. 2*a*) does not include such a handle as the tank lid 48*e* may be readily accessed by an operator utilizing the stairway 54, while standing such that the tank lid 48*e* is approximately waist to chest height.

As previously noted, the tank openings 42*a-e* may have relatively large planform dimensions to permit commodities to be spread about the commodity chambers in a substantially even or distributed manner during initial filling. The tank lids 48*a-e* are thus likewise imparted with relatively large planform dimensions equivalent to or greater than the corresponding dimensions of their respective tank openings 42*a-e*. During operation of the ACD cart 22, the commodity chambers are pressurized in conjunction with generation of the pressurized airstreams in which metered amounts of the commodities are entrained. The internal pressures created within the commodity chambers may not be exceptionally high, perhaps on the order of about 2 pounds per square inch (about 14 kilopascal). Significant pressure loading forces may still be exerted on the interior of the tank lids 48*a-e* by the pressurized air within the commodity chambers, however, due to the relatively large surfaces of the tank lids 48*a-e* exposed to the elevated internal pressures. For example, one or more of the tank lids 48*a-e* may be subject to pressure loading forces approaching or exceeding about 2000 pounds (about 900 kilograms), depending upon the effective inner surface areas of the tank lids and the interior pressures created within the commodity chambers. In contrast to conventional sealed lid designs, the closure assemblies 44*a-e* are uniquely adapted to leverage such pressure loading forces to strengthen rather than weaken the seal created between the tank openings 42*a-e* and the tank lids 48*a-e* when closed, as described more fully below.

Figure 3:
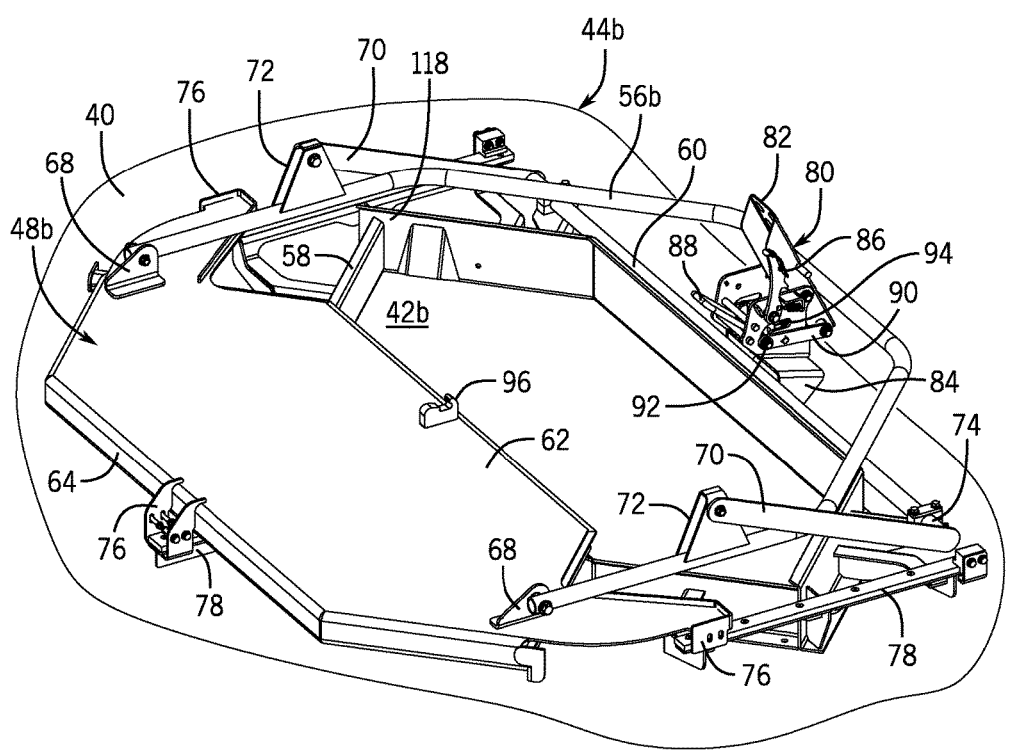
FIGS. 3 and 4 are isometric views of a pressure-energized closure assembly in open and closed positions, respectively, as illustrated in accordance with a further example embodiment.
Figure 4:
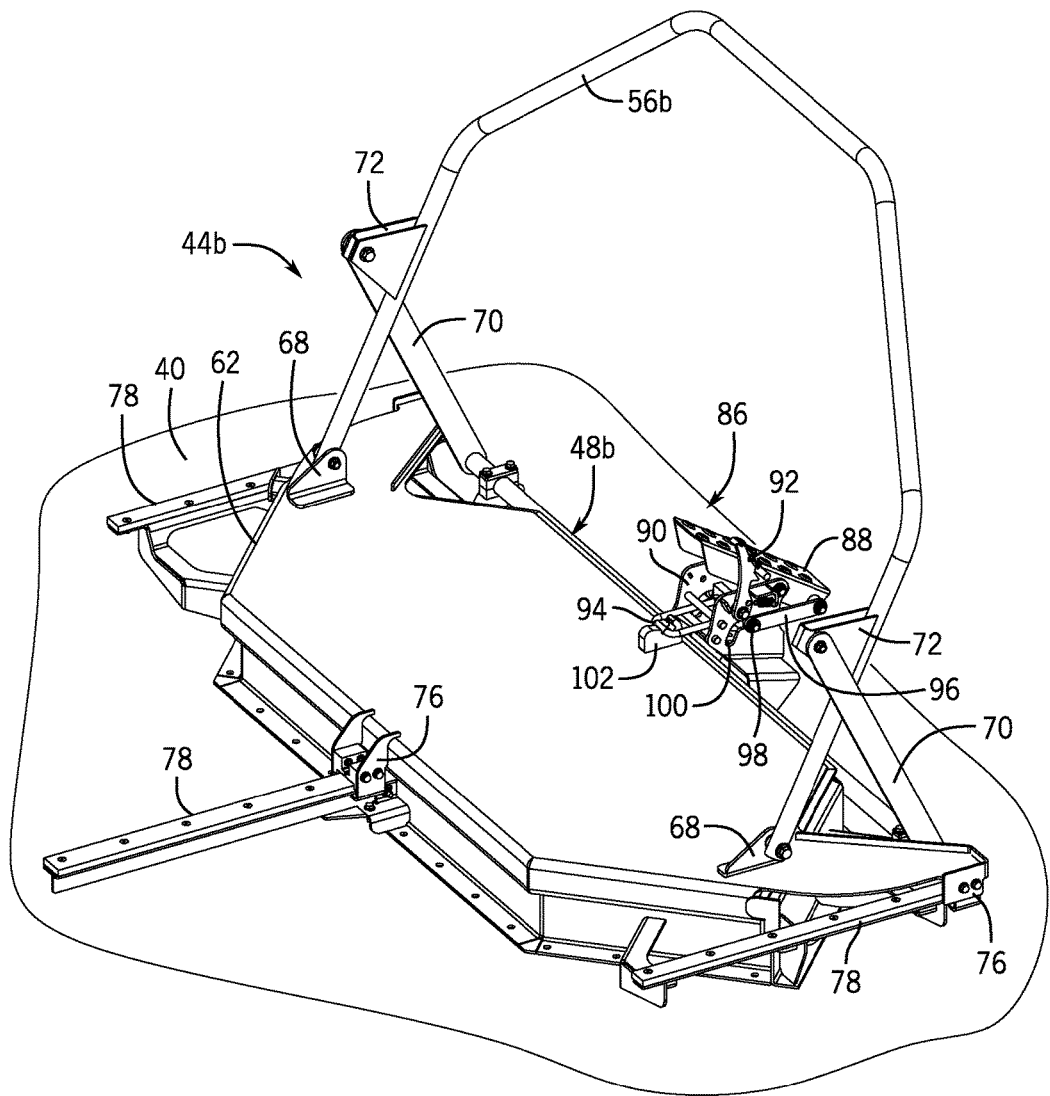

FIGS. 3 and 4 are detailed views of the closure assembly 44*b* illustrating the tank lid 48*b* in open and closed positions, respectively. As the closure assembly 44*b* is similar or substantially to the closure assemblies 44*c* and 44*d* shown in FIGS. 2A-B, the following description is equally applicable thereto. As can be seen most readily in FIG. 3, the closure assembly 44*b* further includes a staggered or stepped tank opening flange 58, 60, which extends along the periphery of the tank opening 42*b*. The stepped tank opening flange 58, 60 includes first and second tank flange lips 58 and 60, which each extend along a peripheral segment of the stepped tank opening flange 58, 60. The tank flange lips 58 and 60 may be formed as bends in an upper portion of the tank flange 58, 60. Similarly, the tank lid 48*b* includes a substantially flat cover 62 and a staggered or stepped lid flange 64, 66, which extends around the periphery of the cover 62. As does the stepped tank opening flange 58, 60, so too does the stepped lid flange 64, 66 include two lips: a first lid lip 64 and a second lid lip 66, which each extend along a peripheral segment of the stepped lid flange 64, 66. The lid lips 64 and 66 may be formed as bends or curls in the underside of the cover 62. The tank flange lips 58 and 60 extend, at least in part, toward a first side of the pressurized supply tank 40. Conversely, the lid lips 64 and 66 extend, at least in part, toward a second side, opposing side of the pressurized supply tank 40. Thus, at least a part of the tank flange lip 58 and the lid lip 64 are located on the exterior of the pressurized supply tank 40 when the tank lid 48*b* is in the closed position, while at least a least a part of the tank flange lip 60 and the lid lip 66 are located on the interior of the tank 40 when the tank lid 48*b* is closed. When the tank lid 48*b* is moved into the closed position shown in FIG. 4, a low leakage or ultralow leakage, 360 degree seal may be created between the stepped tank opening flange 58, 60 the stepped lid flange 64, 66 to sealingly enclose the tank opening 42*b*. The manner in which the stepped tank opening flange 58, 60, the stepped lid flange 64, 66, and perhaps other structural features of the closure assembly 44*b* (e.g., one or more compressible seals) cooperate to produce such a low leakage, 360 degree seal is described more fully below in conjunction with FIGS. 5-9. First, however, additional description of the manner in which the tank lid 48*b* of the closure assembly 44*b* transitions between the open and closed positions will be provided.

An operator utilizes the handle 56*b* of the closure assembly 44*b* to move the tank lid 48*b* between the open and closed positions shown in FIGS. 3 and 4, respectively. The motion path traveled by the tank lid 48*b* when transitioning between the open and closed positions, and relatedly the manner in which the handle 56*b* is joined to the tank lid 48*b*, may vary amongst embodiments. In the case of the example closure assembly 44*b*, the lower ends of the handle 56*b* are pivotally coupled to the tank lid 48*b* by hinge joints 68. Additionally, middle portions of the handle 56*b* are each pivotally coupled to the upper terminal end of a pivot bar 70 by a hinge joint 72. The opposing lower terminal ends of the pivot bars 70 are, in turn, pivotally or rotatably mounted to the stepped tank opening flange 58, 60 or to other static structure of the ACD cart 22 (FIGS. 1-2B) by one or more rotatable couplings 74, such as a rotatable bar-type coupling (FIG. 3). In the illustrated example, movement of the tank lid 48*b* is further restrained to sliding motion along a single (e.g., lateral) axis by a series of guides 76, which are affixed to the tank lid 48*b* at different locations. Each guide 76 slidably engages an elongated rail 78, which is affixed to the stepped tank opening flange 58, 60 or to other static structure of the ACD cart 22 (FIGS. 1-2B) and which projects from the tank opening flange 58, 60 is a laterally outboard direction (to the left in FIGS. 3 and 4).

Figure 5:
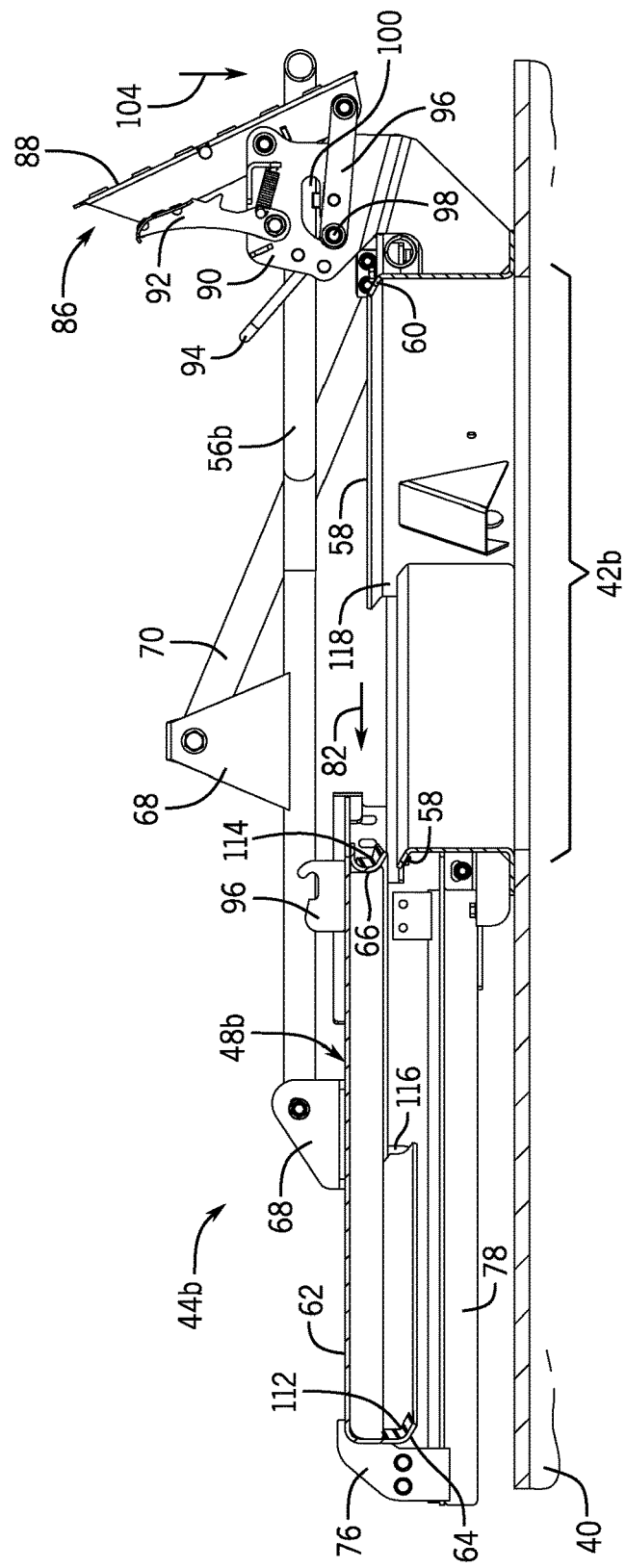

By virtue of the above-described structural arrangement, an operator standing on the platform 50 (to the right of the handle 56b in FIGS. 3 and 4) may manipulate the handle 56b to move the tank lid 48b from the open position shown in FIG. 3 to the closed position shown in FIG. 4. This may be more fully appreciated by referring to FIGS. 5 and 6, which further illustrate the closure assembly 44b in open and closed positions, respectively, in cross-section. The manner in which the tank lid 48b slides in a laterally outward direction (that is, away from the centerline of the pressurized supply tank 40) when moved into the open position is indicated in FIG. 5 by arrow 80. Conversely, the manner in which the tank lid 48b slides in a laterally inward direction (that is, toward the centerline of the pressurized supply tank 40) when moved into the closed position is indicated in FIG. 5 by arrow 82. When the tank lid 48b is open, the handle 56b resides in a flat or stowed orientation, as shown in FIGS. 3 and 5. To close the tank lid 48b, an operator need only pull upwardly on the handle 56b in the manner indicated by arrow 84 in FIG. 6. In response to this manually-applied force, the handle 56b and the pivot bars 70 simultaneously rotate in opposite directions and into the substantially upright positions shown in FIGS. 4 and 6. Concurrently, a sliding force is exerted on the tank lid 48b at the hinge joints 68 sufficient to move the tank lid 48b into the closed position (FIGS. 4 and 6).

Notably, the handle 56b remains readily within the reach of an operator on the platform 50 (to the right in FIGS. 3-6) when the tank lid 48b is in both open and closed positions. The operator need not reach over the tank opening 42b to grasp the handle 56b when the tank lid 48b is open. Furthermore, when the tank lid 48b is moved into the open position (FIGS. 3 and 5) by an operator, the handle 56b rotates into a substantially flat or stowed orientation providing unfettered manual access to the tank opening 42b by the operator while standing on the platform 50. By comparison, the handle 56b physically blocks manual access to the covered tank opening 42b by an operator standing on the platform 50 when the tank lid 48b is in the closed position (FIG. 4). Specifically, the handle 56b blocks an opening provided in the railing 52 surrounding platform 50 (FIGS. 1 and 2A) when the tank lid 48b is in the closed position (FIG. 4). In this manner, the handle 56b of the closure assembly 44b acts as a gate, which provides manual access to the tank opening 42b when needed, but otherwise cooperates with the railing 52 to enclose the perimeter of the platform 50. Safety is improved as a result.

The closure assembly 44b further includes a pull-action latch 86 for selectively securing the tank lid 48b in the closed position (FIG. 4). In the illustrated embodiment wherein an operator stands above the tank lid 48b when utilizing the handle 56b, the latch 86 is conveniently implemented as a foot-operated latch. When so implemented, the latch 86 may include a pivoting pedal 88, a base 90 to which the pivoting pedal 88 is rotatably mounted, and a spring-loaded locking mechanism 92, which is further rotatably coupled to the base 90 and which may also be foot-operated. A catch mechanism 94 (e.g., a U-shaped bar) is further pivotally coupled to a first end of a bar link 96, the opposing end of which is rotatably joined to the pivoting pedal 88. A pin 98 rotatably joins the catch mechanism 94 to the bar link 96 and rides in a curved or arced slot 100 provided in the base 90. A hook 102 is affixed to the tank lid 48b and may be selectively engaged by the catch mechanism 94 to secure or release the tank lid 48 from the closed position. Specifically, the catch mechanism 94 rotates and translates in conjunction with movement of pedal 88 to either engage or disengage hook 102 in the manner described below.

To release the tank lid 48b from the closed position shown in FIGS. 4 and 6, an operator first pivots the spring-loaded locking mechanism 92 in a counterclockwise direction using his or her foot, and subsequently presses downwardly on pivoting pedal 88 in the direction indicated in FIG. 5 by arrow 104. This causes the catch mechanism 94 to rotate upwardly and disengage from the hook 102 thereby freeing the tank lid 48b to slide open in a laterally outward direction. Conversely, to engage the closure assembly 44b, the operator first moves the tank lid 48b adjacent the fully closed position shown in FIGS. 4 and 6 utilizing the handle 56b. Afterwards, and as illustrated in greater detail in FIG. 7, the operator utilizes his or her foot to rotate the pivoting pedal 88 downwardly in the manner indicated by arrow 108. As further indicated by arrow 110 in FIG. 7, this causes latch 86 to translate away from tank opening 42b and thereby exert a clamping or pre-load force on the tank lid 48b urging the stepped lid flange 64, 66 against the stepped tank opening flange 58, 60. Such a pre-load force may help ensure that low leakage seal is provided between the vertical transition areas between the stepped tank opening flange 58, 60 and the stepped lid flange 64, 66, as described below. As the pivoting pedal 88 rotates downward, the spring-loaded locking mechanism 92 engages a projection extending from the pedal 88 to lock the pedal 88 in place until manually released by an operator. In this manner, the pivoting pedal 88 may be utilized to translate catch mechanism 94 toward or away from the side of the pressurized supply tank 40 to which pivoting pedal 88 is mounted.

As previously noted, a low leakage, 360 degree seal is created between the stepped lid flange 64, 66 and the stepped tank opening flange 58, 60 when the tank lid 48b is moved into the closed position shown in FIGS. 4 and 6. In certain embodiments, the stepped lid flange 64, 66 may directly contact the stepped tank opening flange 58, 60 such that a metal-on-metal seal is created between the tank flange lips 58 and 60 and the lid lips 64 and 66, respectively. A more robust seal may be created, however, by positioning one or more compressible seals between the lid lips 64 and 66 and the tank flange lips 58 and 60. In the illustrated example, a compressible seal 112, 114 is carried by the tank lid 48b and extends over the lid lips 64 and 66. More specifically, the compressible seal 112, 114 includes a first seal part 112 extending along the interior of lid lip 64, and a second seal part 66 extending along the exterior of the lid lip 66. The seal parts 112 and 114 may be integrally formed as a singe (e.g., molded) piece, which forms a complete ring having a planform shape generally conforming to the shape of the tank lid 48b. Alternatively, the seal parts 112 and 114 may be produced as discrete pieces or seals, which are separately affixed to the lid lips 64 and 66, respectively. In this case, the seal part 112 may be produced to have a substantially U-shaped geometry extending along three sides of the tank lid 48b, while the seal part 114 may be produced to have a linear or substantially straight geometry extending along the fourth side of the tank lid 48b. In one embodiment, the compressible seal 112, 114 is a cast urethane seal, which is glued, bolted, or otherwise attached to the tank lid 48b. The compressible seal 112, 114 may also have a downward sloped geometry (e.g., a windshield wiper-type geometry) to minimize the likelihood of commodities becoming trapped between the seal 112, 114 and the stepped tank opening flange 58, 60. In other embodiments, the compressible seal 112, 114 may have other shapes, compositions, and may be attached to the compressible seal 112, 114 in other manners. Additionally, in further embodiments, multiple compressible seals may be utilized, and one or more seals may be affixed to the stepped tank opening flange 58, 60 in addition to or in lieu of the seal or seals affixed to the tank lid 48b.

Figure 8:
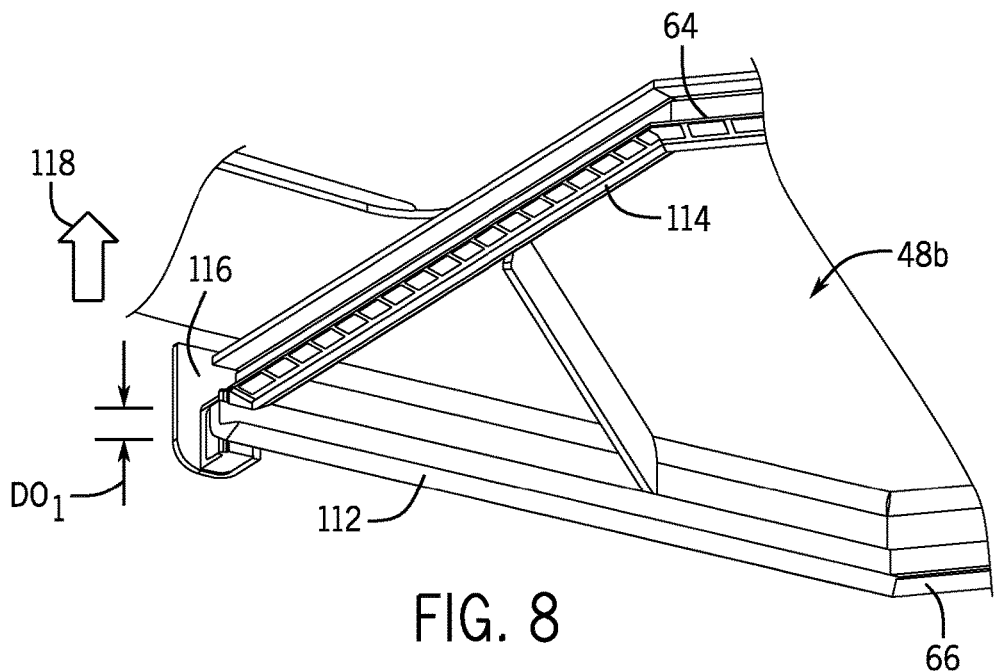
FIGS. 8 and 9 are isometric views illustrating corner regions of the tank lid and the tank opening flange, respectively.
Figure 9:
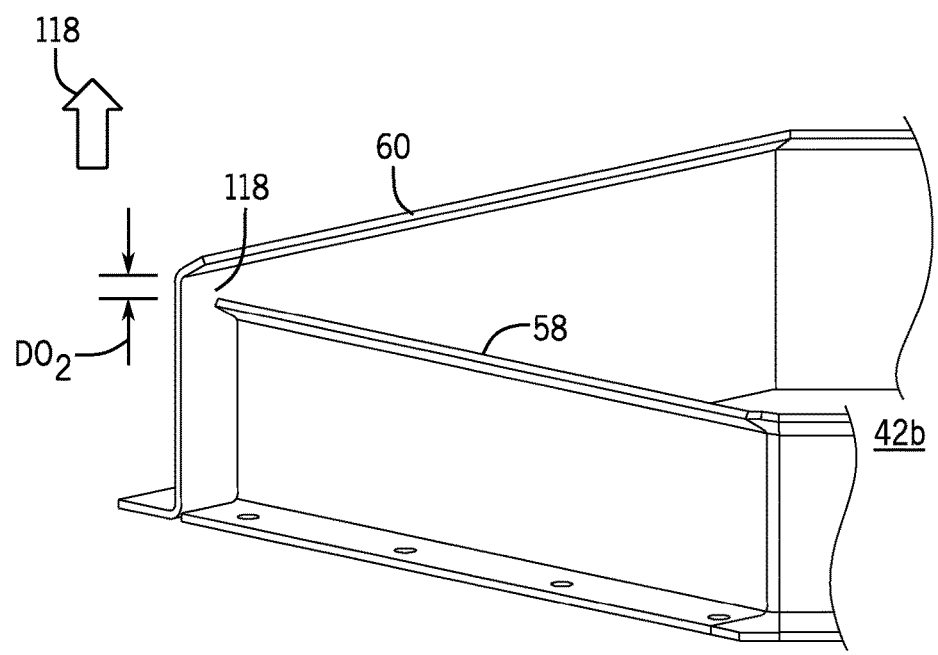
Figure 10:
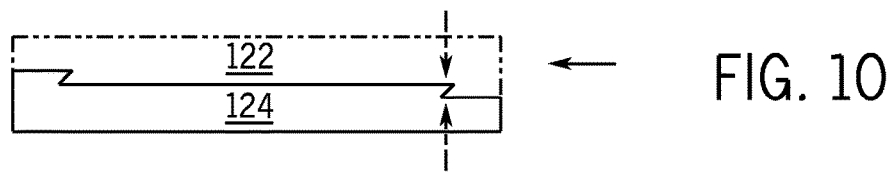
FIGS. 10-19B are schematics illustrating a number of different closure assemblies in open and closed positions.
Figure 11:
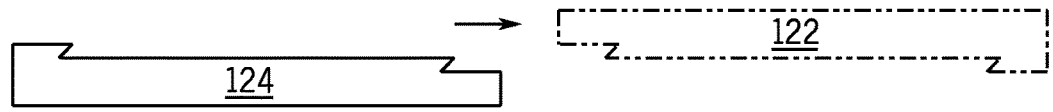
Figure 12:
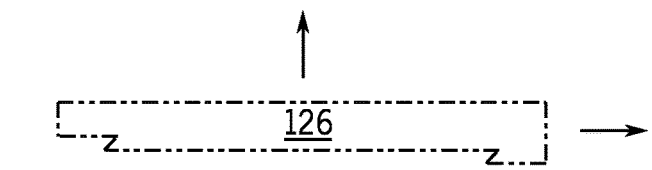
Figure 13:
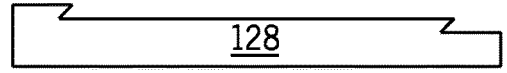
Figure 14:
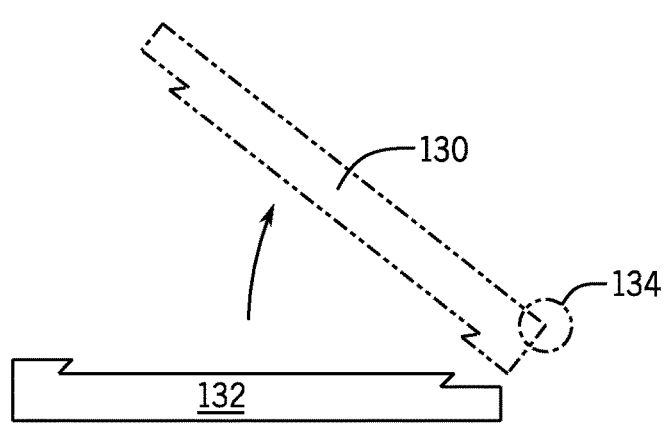

Referring now to FIGS. 8 and 9 in conjunction with FIGS. 3-7, the lid lips 64 and 66 are stepped or offset in a direction opposite the interior of the pressurized supply tank 40 (referred to herein as the "offset direction"). Due to this offset, the tank lid 48b further includes two lid flange transition walls 116, which extend between the lid lips 64 and 66 in the offset direction. The offset direction is identified by arrows 120 shown in FIGS. 8 and 9, which are detailed views of an underside corner region of the tank lid 48b and a corner region of the stepped tank opening flange 58, 60, respectively. In the case of the example closure assembly 44b, the offset direction is substantially vertical (parallel with the direction of gravity); however, this need not always be the case. Additionally, while forming substantially perpendicular angles with the lid lips 64 and 66 in the illustrated example, the lid flange transition walls 116 may be slanted or angled with respect to the lid lips 64 and 66 in further embodiments. The tank flange lips 58 and 60 are likewise offset in an direction opposite the interior of the pressurized supply tank 40 and are separated by tank flange transition walls 118 (shown in FIGS. 3-6 and FIG. 9). The lid lips 64 and 66 may be offset by a first step height or offset distance (identified by convergent arrows "$DO_1$," in FIG. 8), while the tank flange lips 58 and 60 may be offset by a second step height or offset distance (identified by convergent arrows "$DO_2$" in FIG. 9). $DO_2$ may correspond to (e.g., be substantially equivalent to) to offset distance $DO_1$ to ensure alignment between the lid lips 64 and 66 and the tank flange lips 58 and 60 when the tank lid 48b is moved into the closed position.

The compressible seal 112, 114 is disposed between the stepped tank opening flange 58, 60 and the stepped lid flange 64, 66 such that, when the tank lid 48b is moved into the closed position (FIGS. 4 and 6), the compressible seal 112, 114 engages the tank flange lips 58 and 60 from an interior side of the pressurized supply tank 40. The seal 112, 114, engages the tank flange lips 58 and 60 of the stepped tank opening flange 58, 60 from the tank interior side and further engages walls of the tank flange lips 58 and 60 from the exterior side of the pressurized supply tank 40, as taken in the offset direction. In this manner, the compressible seal 112, 114 is compressed between the lid lips 64 and 66 and the tank flange lips 58 and 60, respectively, to create a low leakage (e.g., airtight or near airtight) seal extending around the periphery of the interface between the tank lid 48b and the tank opening 42b when the tank lid 48b is closed. Additionally, the angled surfaces of the compressible seal 112, 114 form a wedge with the angled surfaces of the tank flange lips 58 and 60 under the lateral preload force exerted by the foot-operated latch 86 (FIGS. 3-6) to initially compress and thereby energize seal 112, 114. During operation of ACD cart 22 (FIGS. 1-2B), pressure loading urging movement of the tank lid 48b away from pressurized supply tank 40 further urges compressible seal 112, 114 against the angled surfaces of the tank flange lips 58 and 60 in such a wedged relationship to further reinforce the seal. Additionally, the lateral preload force exerted by the foot-operated latch 86 may compress any sections of the compressible seal 112, 114 extending over the lid flange transition walls 188 to seal the vertical transition areas between the staggered or stepped sets of flange lips included within both the tank opening flange 58, 60 and the lid flange 64, 66. Little to no leakage of pressurized air is thus permitted between sealed interface created between compressible seal 112, 114 and tank opening flange 58, 60 to optimize performance of ACD cart 22 and to help prevent contamination of the agricultural commodities contained therein. This is highly beneficial.

There has thus been described an example embodiment of a pressure-energized closure assembly (e.g., closure assembly 44b) well-suited for enclosing the pressurized supply tank of an ACD cart or another agricultural machine. In the above-described example, the closure assembly is configured such that the tank lid moves along a linear, single degree of freedom (DOF) sliding path when transitioning between closed and open positions. In further embodiments, the closure assembly may move along other paths, including multi-DOF or compound motion paths, providing that the tank lid 48b may slidably disengage from the stepped tank opening flange to unseat the seal formed therebetween. Additionally, it is often desirable for the tank to be moved into a position wherein the tank lid 48b uncovers the tank opening in its entirety or substantial entirety to provide unfettered manual access thereto. Many different structural arrangements may be provided for conveying or guiding the movement of the tank lid in this manner. Consider, for example, the schematic examples shown in FIGS. 10-14 illustrating several pressure-energized closure assemblies having tank lids (shown in phantom) movable with respect to tank opening flanges. In the example shown in FIGS. 10 and 11, the illustrated closure assembly includes a tank lid 122, which is slidably disengaged from a tank opening flange 124 along a linear axis in a manner similar to the example closure assembly 44b described above in conjunction with FIGS. 1-9. In contrast, in the case of the example closure assembly shown in FIG. 12, the illustrated tank lid 126 is slid along a linear path (to the right in FIG. 12) to unseat the seal formed with the illustrated tank opening flange 128 and subsequently moved upward to uncover the tank opening surrounded by the tank opening flange 128. As a still further example, in the case of the closure assembly shown in FIGS. 13 and 14, the illustrated tank lid 130 is initially slid in a linear direction to unseat the seal formed with the illustrated tank opening flange 132 and subsequently rotated or pivoted about a hinge joint 134 to provide access to the tank opening surrounded by the tank opening flange 132. Still further motion paths may be followed by the tank lid when transitioning between open and closed positions in alternative embodiments of the pressure-energized closure assemblies. For example, in the case of the closure assembly 44a shown in FIGS. 2A-2B, an operator may rotate the handle 56a to move the tank lid 48a between open and closed positions. The handle 56a also rotates from a blocking position to a non-blocking position in conjunction with opening of the tank lid 48a to provide a gate function, as previously described. Finally, in the case of closure assembly 44e shown in FIG. 2B, an operator may unlatch the tank lid 48e, slide the tank lid 48e toward pressurized supply tank 40 to unseat the seal, and then pivot the tank lid 48e upward into a fully open position.

Figure 15A:
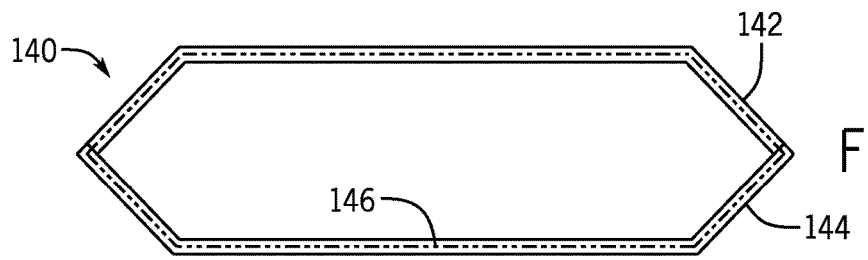
Figure 15B:
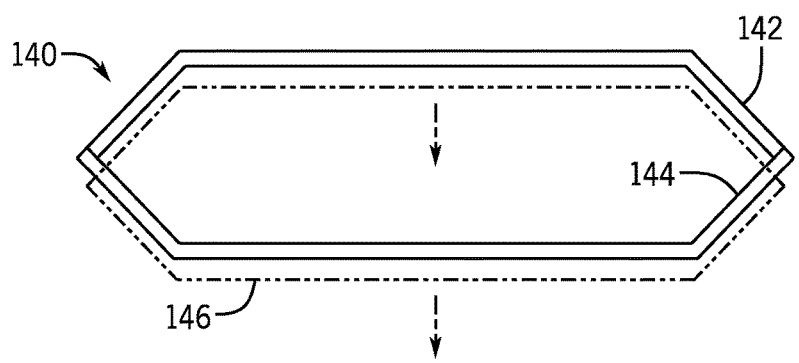
Figure 16A:
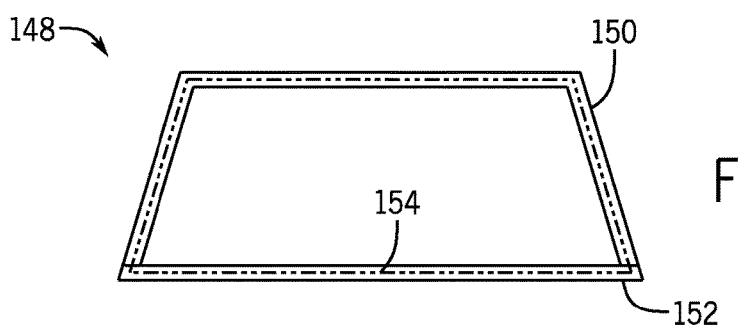
Figure 16B:
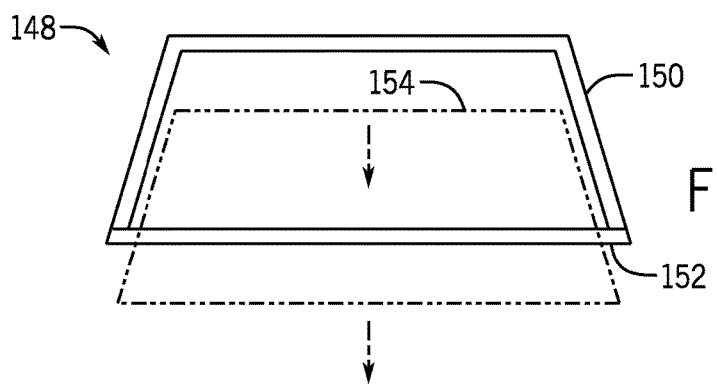

The tank opening flanges and their corresponding lid flanges may be produced to have various shapes, dimensions, and dispositions. In the case of the above-described closure assembly 44b, the stepped tank opening flange 58, 60 and the stepped lid flange 64, 66 each have a planform shape of an elongated diamond. Advantageously, such a shape enables the seal formed between the stepped tank opening flange 58, 60 and the stepped lid flange 64, 66 to unseat within a relatively short travel distance away from the closed position. This may be appreciated by referring to FIGS. 15A-B, which schematically illustrate a pressure-energized closure assembly 140 including a tank opening flange 142, 144 and an overlying tank lid flange 146 (shown in phantom). First and second flange lips 142 and 144 extend around the periphery of the tank opening flange 142, 144 and are offset or stepped in an offset direction (orthogonal to the plane of the page in FIGS. 15A-B). As can be seen, the elongated diamond shape of the tank opening flange 142, 144 and the tank lid flange 146 allow the seal formed therebetween to completely disengage or fully unseat with a relatively short range of travel away from the closed position (FIG. 15A). For example, the illustrated elongated diamond shape with the 45 degree angle ends may require only about 1.5 inches of linear travel in order to allow the lid to pivot. When compared to rectangular openings the linear travel distance would be about the corresponding dimension of the opening flange, which could be 12 inches or more. Such a configuration may thus help to ease manual opening of the closure assembly and reduce seal wear. These advantages notwithstanding, the tank opening flange and the lid flange may have various other geometries and dimensions in further embodiments of the pressure-energized closure assembly. For example, as schematically shown in FIGS. 16A-B, a pressure-energized closure assembly 148 may include a tank opening flange 150, 152 and an overlying tank lid flange 154 (shown in phantom) each having a trapezoidal shape, which increases in width in the direction in which the tank lid travels when slid into an open position in the manner indicated in FIG. 16B. Again, the tank opening flange 150, 152 includes tank flange lips 150 and 152, which are offset in an offset direction. The tank lid flange 154 is likewise provided with an offset lips, which are not shown in FIGS. 16A-B to avoid obscuring the drawing. As may be appreciated by comparing FIGS. 15A-B to FIGS. 16A-B, a longer range of travel may be required to fully unseat the tank lid flange 154 from the tank opening flange 150, 152 relative to the closure assembly 140. However, this range of travel may still be a fraction of the total range of motion over which the tank lid flange 154 travels when the tank lid is moved into the fully open position (not shown).

Figure 17A:
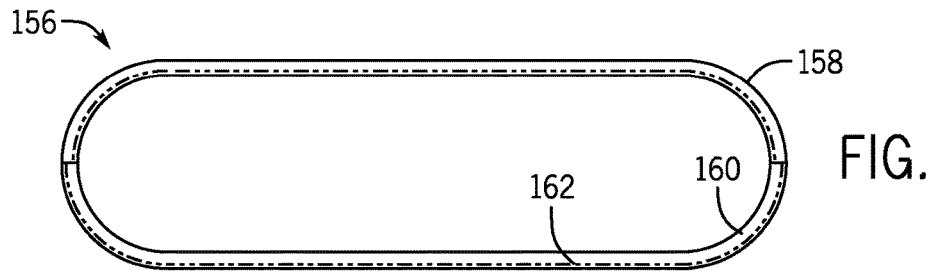
Figure 17B:
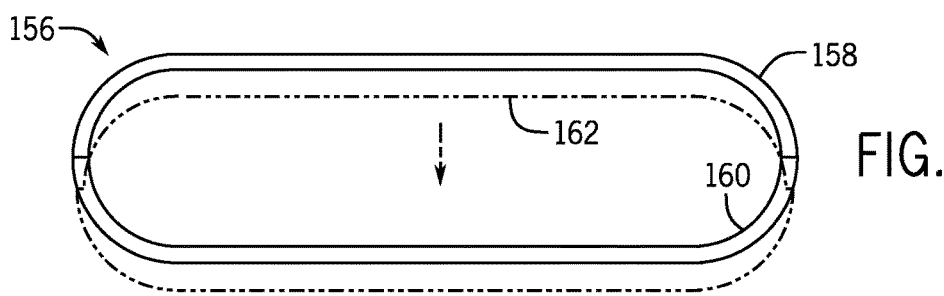
Figure 18A:
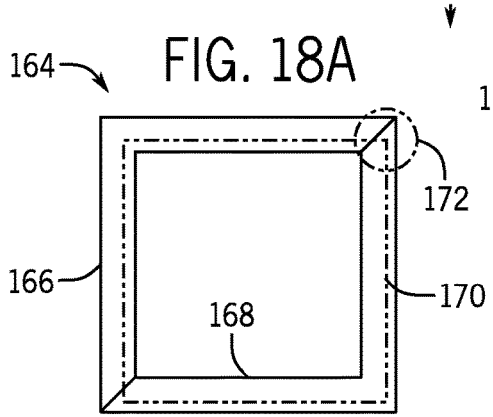
Figure 18B:
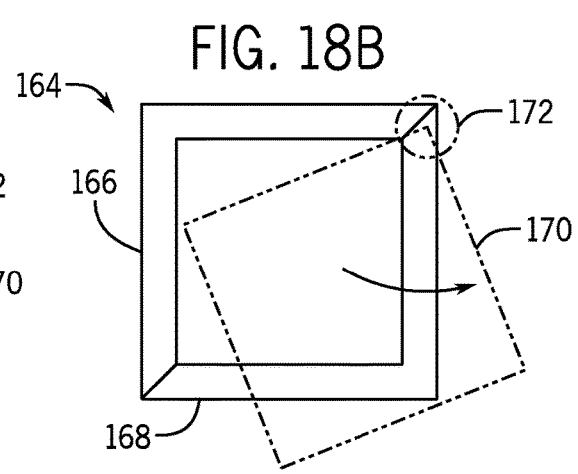
Figure 19A:
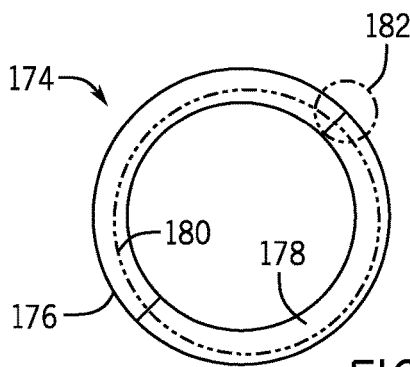
Figure 19B:
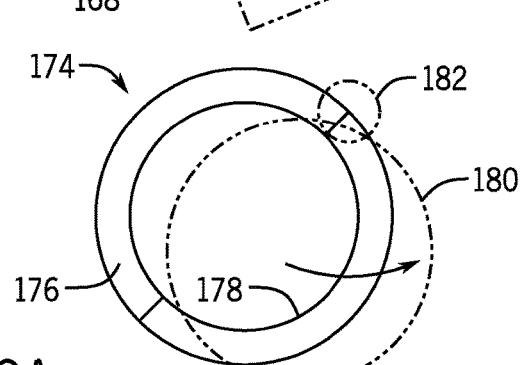

A further example of a pressure-energized closure assembly 156 is shown schematically in FIGS. 17A-B. In this example, the pressure-energized closure assembly includes tank opening flange 158, 160 having offset flange lips 158 and 160. A tank lid flange 162 overlies the tank opening flange 158, 160 when the tank lid bearing flange 162 is in the closed position shown in FIG. 17A. In this embodiment, the tank opening flange 158, 160 and the tank lid flange 162 each have an elongated ovular planform or "racetrack" geometry. As was previously the case, the tank lid bearing the tank lid flange 162 is slidable in a linear direction to unseat the seal formed between tank opening flange 158, 160 and the tank lid flange 162. Still further examples of pressure-energized are shown in FIGS. 18A-19B. Referring specifically to FIGS. 18A-B, there is shown a pressure-energized closure assembly 164 including a tank opening flange 166, 168 and a tank lid flange 170 (shown in phantom), each having a substantially square or rectangular planform shape. In this case, the tank lid bearing the tank lid flange 170 is rotatable with respect to the tank opening flange 166, 168 about a pivot connection 172. The tank lid bearing the tank lid flange 170 may thus be rotated between the seated and unseated positions in the manner shown in FIGS. 18A-B. Finally, yet another example of a pressure-energized closure assembly 174 is shown in FIGS. 19A-B. In this case, the closure assembly 174 includes a tank opening flange 176, 178 and a tank lid flange 180 (shown in phantom), each having a substantially round or circular planform shape. The tank lid bearing the tank lid flange 180 is rotatable about a pivot connection 182 to move the tank lid to seat and unseat the seal formed between the tank opening flange 176, 178 and the tank lid flange 180. The tank lid bearing the tank lid flange 180 may thus be rotated between the seated and unseated positions in the manner shown in FIGS. 19A-B.

There has thus been provided multiple example embodiments of closure assemblies having pressure energized, under seal lids. The closure assemblies are configured such that increasing pressure loading on a tank lid (specifically, increasing pressure exerted on the interior of the tank lid) tends to reinforce rather than compromise the seal formed by the closure assembly when the tank lid is closed. The closure assemblies may be utilized to sealingly enclose the tank openings of an agricultural machine, such as an ACD cart. Embodiments of the closure assemblies may include handles, which project upwardly from the tank lids to provide easily manual access in embodiments wherein the closure assemblies are manually opened by an operator standing above the tank lids. The handles usefully provide a gate function by blocking openings in the railing of the platform when the tank lids are in closed positions, while rotating or otherwise moving into a position permitting unfettered manual access to the tank openings when the tank lids are opened. Embodiments of the closure assembly may further allow the sealing interface formed between the tank lid and the tank opening to fully unseat with a relatively short travel of the tank lid away from the closed position. In still further embodiments, the closure assemblies may include pull-action latches, which exert lateral closure forces in the direction in which the tank lids are closed when the latches are engaged to help seal any vertical transition areas of the seal interfaces, and thereby further enhance seal integrity. The latch may be foot-operated in embodiments wherein the closure assemblies are manually opened by an operator standing above the tank lids.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

Furthermore, in detailing the disclosure, terms of direction and orientation, such as "forward," "aft," "lateral," "horizontal," and "vertical" may be used. Such terms are defined, at least in part, with respect to the direction in which the tillage implement is towed or otherwise moves during use. The term "forward" and the abbreviated term "fore" (and any derivatives and variations) refer to a direction corresponding to the direction of travel of the tillage implement, while the term "aft" (and derivatives and variations) refer to an opposing direction. The term "fore-aft axis" may also reference an axis extending in fore and aft directions. By comparison, the term "lateral axis" may refer to an axis that is perpendicular to the fore-aft axis and extends in a horizontal plane; that is, a plane containing both the fore-aft and lateral axes. The term "vertical," as appearing herein, refers to an axis or a direction orthogonal to the horizontal plane containing the fore-aft and lateral axes.

Moreover, the terminology used herein is for the purpose of describing particular embodiments only and is not intended to be limiting of the disclosure. Thus, it will be appreciated that the term "axial" as used herein refers to a direction that is generally parallel to an axis of rotation, axis of symmetry, or centerline of a component or components. For example, in a cylinder with a centerline and opposite, circular ends, the "axial" direction may refer to the direction that generally extends in parallel to the centerline between the opposite ends. In certain instances, the term "axial" may be utilized with respect to components that are not cylindrical (or otherwise radially symmetric). For example, the "axial" direction for a rectangular housing containing a rotating shaft may be viewed as a direction that is generally in parallel with the rotational axis of the shaft. Furthermore, the term "radially" as used herein may refer to a direction or a relationship of components with respect to a line extending perpendicularly outward from a shared centerline, axis, or similar reference. For example, two concentric and axially overlapping cylindrical components may be viewed as "radially" aligned over the portions of the components that axially overlap, but not "radially" aligned over the portions of the components that do not axially overlap. In certain instances, components may be viewed as "radially" aligned even though one or both of the components may not be cylindrical (or otherwise radially symmetric).

Similarly, the singular forms "a", "an" and "the" are intended to include the plural forms as well, unless the context clearly indicates otherwise. It will be further understood that any use of the terms "comprises" and/or "comprising" in this specification specifies the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various implementations other than those explicitly described are within the scope of the claims.

What is claimed is:

1. In an agricultural machine having a supply tank with a tank opening, a closure assembly comprising:
    a tank opening flange for surrounding the tank opening, the tank opening flange having a first tank flange lip and a second tank flange lip at a tank opening flange offset distance from the first tank flange lip in an offset direction opposite an interior of the tank, the first and second tank flange lips extending, at least in part, toward a first side of the tank and separated by tank opening flange transition walls extending in the offset direction;
    a tank lid having a cover and a lid flange having a first lid lip and a second lid lip at a lid flange offset distance from the first lid lip in the offset direction corresponding to the tank opening flange offset distance, the first and second lid lips extending, at least in part, toward a second side of the tank opposite the first side of the tank and separated by lid flange transition walls extending in the offset direction, wherein the first and second lid lips include first and second lid lip walls arranged at a tank interior side of the respective first and second tank flange lips in the offset direction; and
    at least one seal disposed between the tank opening flange and the tank lid so that when the tank lid is mounted to the tank opening flange to close the tank opening the at least one seal engages the first and second tank flange lips of the tank opening flange from the tank interior side and engages the first and second lid lip walls of the lid flange from an exterior side of the tank in the offset direction;
    wherein at least a part of the second tank flange lip and at least a part of the second lid lip are located within a space vertically aligned with the interior of the tank when the tank lid is mounted to the tank opening flange to close the tank opening.

2. The closure assembly of claim 1, wherein at least a part of the first tank flange lip and at least a part of the first lid lip are located at an exterior of the space vertically aligned with the interior of the tank when the tank lid is mounted to the tank opening flange to close the tank opening.

3. The closure assembly of claim 2, wherein the tank opening flange extends along a periphery of the tank opening and the first tank flange lip extends along a first peripheral segment of the tank opening flange and the second tank flange lip extends along a second peripheral segment of the tank opening flange; and
    wherein the lid flange extends along a periphery of the tank lid and the first lid lip extends along a first peripheral segment of the lid flange corresponding to the first peripheral segment of the tank opening flange and the second lid lip extends along a second peripheral segment of the lid flange corresponding to the second peripheral segment of the tank opening flange.

4. The closure assembly of claim 3, wherein the at least one seal includes a first seal and a second seal, wherein the first seal is mounted to the first lid lip along the first peripheral segment of the lid flange and the second seal is mounted to the second lid lip along the second peripheral segment of the lid flange.

5. The closure assembly of claim 4, wherein at least one of the first and second lid lips includes one of a bend and a curl capturing the associated one of the first and second tank flange lips and directing the associated one of the first and second lid lip walls to extend toward the second side of the tank when the tank lid is mounted to the tank opening flange to close the tank opening.

6. The closure assembly of claim 5, wherein the tank opening flange has a configuration that is one of at least in part arcuate and rectilinear with opposite sides at least in part aligned along converging axes extending in a direction from the first side of the tank to the second side of the tank; and
    wherein the lid flange of the tank lid has a configuration that is one of at least in part arcuate and rectilinear with opposite sides at least in part aligned along converging axes extending in a direction from the first side of the tank to the second side of the tank, the configuration of the lid flange corresponding to the configuration of the tank opening flange.

7. The closure assembly of claim 6, wherein the configuration of each of the tank opening flange and the lid flange is that of a circle, an oval, a racetrack, a diamond, and an elongated diamond.

8. The closure assembly of claim 1, further including a latch mountable to at least one of the tank and the tank opening flange at the second side of the tank for securing the tank lid to the tank opening flange and to engage the at least one seal with the first and second tank flange lips of the tank opening flange and the first and second lid lip walls of the lid flange.

9. The closure assembly of claim 8, wherein the latch is configured to unlatch the tank lid from the tank opening flange; and
wherein the latch is configured to latch the tank lid to the tank opening flange and apply a pre-load force on the at least one seal by translating the tank lid in a direction from the first side of the tank to the second side of the tank.

10. The closure assembly of claim 9, wherein, when the tank lid is latched to the tank opening flange to close the tank opening, the lid flange transition walls align with the tank opening flange transition walls and the pre-load force applies a compressive force to portions of the at least one seal disposed between the tank opening flange and lid flange transition walls.

11. The closure assembly of claim 9, wherein the latch is a foot operated latch mounted at the second side of the tank and having a pivoting pedal operable to translate a catch mechanism toward and away from the first side of the tank.

12. The closure assembly of claim 9, further including at least one guide rail mountable to at least one of the tank and the tank opening flange at a first side of the tank, and wherein the tank lid has at least one guide slidably engaged with the at least one guide rail.

13. The closure assembly of claim 9, further including at least one hinge mechanism mountable to at least one of the tank and the tank opening flange at the second side of the tank and allowing the tank lid to translate in the direction between the first and second sides of the tank and pivot with respect to the tank.

14. The closure assembly of claim 9, further including a handle pivotally mountable to at least one of the tank and the tank opening flange at a second side of the tank and to the tank lid by a linkage;
wherein the handle pivots the linkage to translate the tank lid in the direction between the first and second sides of the tank.

15. The closure assembly of claim 1, wherein the tank lid is mountable to the tank along a single pivot axis extending in the offset direction.

16. An agricultural machine, comprising:
a supply tank having a tank opening and a tank opening flange, the tank opening flange having a first tank flange lip and a second tank lip at a tank opening flange offset distance from the first tank lip in an offset direction opposite a tank interior, the first and second tank lips extending, at least in part, toward a first side of the tank and separated by tank opening flange transition walls extending in the offset direction;
a tank lid having a cover and a lid flange having a first lid lip and a second lid lip at a lid flange offset distance from the first lid lip in the offset direction corresponding to the tank opening flange offset distance, the first and second lid lips extending, at least in part, toward a second side of the tank opposite the first side and separated by lid flange transition walls extending in the offset direction, wherein the first and second lid lips include first and second lid lip walls arranged at a tank interior side of the respective first and second tank lips in the offset direction; and
at least one seal disposed between the tank opening flange and the tank lid so that when the tank lid is mounted to close the tank opening the at least one seal engages the first and second tank lips of the tank opening flange from the tank interior side and the first and second lid lip walls of the lid flange from a tank exterior side in the offset direction;
wherein at least a part of the second tank flange lip and at least a part of the second lid lip are located within a space vertically aligned with the tank interior when the tank lid is mounted to the tank opening flange to close the tank opening.

17. The agricultural machine of claim 16, wherein at least a part of the first tank flange lip and at least a part of the first lid lip are located at an exterior of the space vertically aligned with the tank interior when the tank lid is mounted to the tank opening flange to close the tank opening.

18. The agricultural machine of claim 17, further including a latch mountable to at least one of the tank and the tank opening flange at the second side of the tank for securing the tank lid to the tank opening flange and to engage the at least one seal with the first and second tank flange lips of the tank opening flange and the first and second lid lip walls of the lid flange;
wherein the latch is configured to unlatch the tank lid from the tank opening flange; and the latch is configured to latch the tank lid to the tank opening flange and apply a pre-load force on the at least one seal by translating the tank lid in a direction from the first side of the tank to the second side of the tank.

19. The agricultural machine of claim 18, wherein, when the tank lid is latched to the tank opening flange to close the tank opening, the lid flange transition walls align with the tank opening flange transition walls and the pre-load force applies a compressive force to portions of the at least one seal disposed between the tank opening flange and lid flange transition walls.

20. The agricultural machine of claim 16, wherein the agricultural machine is an air cart with a plurality of the supply tanks each having at least one tank opening flange and tank lid, and
wherein at least one of the plurality of supply tanks is pressurized.

* * * * *